United States Patent [19]

Mausner

[11] Patent Number: 4,972,816
[45] Date of Patent: Nov. 27, 1990

[54] DEVICE FOR DETERMINING AND/OR CONTROLLING OPERATING DATA OF AUTOMOTIVE VEHICLES WITH INTERNAL COMBUSTION ENGINES

[75] Inventor: Eberhard Mausner, Liederbach, Fed. Rep. of Germany

[73] Assignee: VDO Adolf Schindling AG, Frankfurt am Main, Fed. Rep. of Germany

[21] Appl. No.: 229,561

[22] Filed: Aug. 5, 1988

[30] Foreign Application Priority Data

Mar. 23, 1988 [EP] European Pat. Off. ........ 88104625.4
Apr. 28, 1988 [JP] Japan ................... 63-104416

[51] Int. Cl.$^5$ .................. F02D 11/10; G01M 15/00
[52] U.S. Cl. .................. 123/399; 73/118.1; 318/565; 324/549; 324/723
[58] Field of Search .............. 123/399, 494, 479; 324/549, 63, 714, 723; 73/118.1; 318/565

[56] References Cited

U.S. PATENT DOCUMENTS

| | | | |
|---|---|---|---|
| 4,546,647 | 10/1985 | Takahashi | 73/118.1 |
| 4,599,696 | 7/1986 | Takahashi | 123/494 |
| 4,622,936 | 11/1986 | Junginger et al. | 123/399 |
| 4,716,306 | 12/1987 | Sato et al. | 307/296 R |
| 4,765,295 | 8/1988 | Ishikawa et al. | 123/399 |
| 4,785,222 | 11/1988 | Pfalzgraf et al. | 123/479 |

FOREIGN PATENT DOCUMENTS 1298181 6/1969 Fed. Rep. of Germany .
3028560 2/1982 Fed. Rep. of Germany .
60-127504 7/1985 Japan .

Primary Examiner—Andrew M. Dolinar
Attorney, Agent, or Firm—Martin A. Farber

[57] ABSTRACT

A device is described for determining and/or controlling the operating data of automotive vehicles, particularly for controlling the velocity of vehicles with internal combustion engines and electric transmission of the position of the gas pedal to an electric setting element which is connected to the throttle valve or the displacement device of the injection pump, the device having a measuring device for determining shunt resistances to the electric position transmitter which is connected to the gas pedal and the throttle valve. Such shunt resistances (leak resistances) detrimentally affect the desired precise relationship of the position of the gas pedal to the position of the throttle valve.

15 Claims, 3 Drawing Sheets

DEVICE FOR DETERMINING AND/OR CONTROLLING OPERATING DATA OF AUTOMOTIVE VEHICLES WITH INTERNAL COMBUSTION ENGINES

FIELD AND BACKGROUND OF THE INVENTION

The present invention relates to a device for determining and/or controlling the operating data of automotive vehicles having an internal combustion engine, with at least one resistance voltage divider with variable division ratio as position transmitter.

The forward movement of automotive vehicles having an internal combustion engine is generally controlled, in accordance with the wishes of the driver, by a setting device, in particular an accelerator pedal, the instantaneous position of which is transmitted to an element which directly or indirectly meters the amount of fuel. This element which meters the amount of fuel can either be the throttle valve or the displacement lever of a fuel injection pump.

For various reasons it may be desirable to provide an electric connection between the setting device and the device feeding the fuel, instead of a mechanical connection. In particular, in the case of commercial vehicles with below-the-floor or rear engines and in the case of pivoted buses with rear engine, the necessary pedal forces can in the case of mechanical transmission by rods or Bowden cable only be kept low and independent of movements of the vehicle by careful placement.

In addition to this, such devices are of unfavorable construction from the standpoint of installation and maintenance.

Devices for maintaining the speed of automotive vehicles constant are also known in which there is no fixed association between the instantaneous position of the setting device and the throttle valve or displacement lever of the fuel injection pump.

It is already known, in a device for regulating the speed of travel of an automotive vehicle having a setting member which is adapted to be actuated by the driver, particularly a gas pedal, to develop the transmission to an element which controls the formation of the fuel/air mixture in such a manner that a follow-up control with a first position transmitter takes place at the desired value input of a controller and with a second position transmitter at the actual-value input thereof. In this connection, the first position transmitter is connected to the gas pedal and the second position transmitter to the throttle valve for the supplying of a return message, the throttle valve being adjusted by a servomotor in order to adapt the actual-value to the desired value.

Since only the position transmitter is connected to the gas pedal, the pedal forces remain low and are not affected even by twists and movements of the vehicle body. The electric line connecting gas pedal and throttle valve or injection pump can be installed without difficulty or restrictive conditions.

For the forming of the electric signal which represents the desired-value and the production of the return-report signal, mechanically variable resistors (potentiometers) are generally provided as voltage dividers. Only relatively narrow tolerances are permitted for the electric values in view of the required precise association between voltage value and potentiometer position. These tolerances must be maintained even after lengthy periods of operation. However, as a result of aging and the action of fuel, oil, water of condensation and dust, they may develop side paths to the resistance paths, so-called leakage resistances, which falsify the original values and thus the association between signal voltage and wiper position. This can lead to undesired or even dangerous conditions of travel.

It is therefore known to provide reference switches which switch upon pre-determined positions of the wipers of the potentiometers. The signal voltage which was tapped off at that moment must lie within a narrow tolerance. Installation and adjustment of the reference switches is time-consuming and expensive.

SUMMARY OF THE INVENTION

It is therefore an object of the invention to provide a device for determining and/or influencing the operating data of automotive vehicles with internal combustion engines, of the type to be described herein, which automatically monitors and corrects the characteristic curve of the variable resistance used in the desired value transmitter.

Accordingly there is provided at least one measurement device (4, 34, 35) for the checking of the operation of the resistance of said at least one resistance voltage divider.

The device having these features in accordance with the invention has the advantage that the desired strict association of the position of the wiper of the variable resistor in the desired value transmitter with the signal voltage derived therefrom is retained even for long periods of time, regardless of any external influences. It is furthermore advantageous that no additional electric connections are necessary for the monitoring and correction.

It is particularly advantageous that the total resistance of the variable resistor in the new state can be stored. Any change can then be detected by the device in accordance with the invention.

The invention also provides such a device with electric transmission of the position of the accelerator pedal to an element which meters the fuel or the intake air in the sense of a follow-up control, in which case a first resistance voltage divider of variable division ratio as desired-value transmitter is mechanically connected to the accelerator pedal and a second resistance voltage divider is mechanically coupled as actual value transmitter to the element which meters the fuel or the intake air, characterized by the fact that a measuring device for the operative monitoring of the resistance is associated with each position transmitter.

A feature of the invention is that a measurement resistor (4) is arranged in the feed-line of an external connection of the position transmitter (1).

Still further according to a feature of the invention, the inputside connection and the outputside connection of the measurement resistor (4) are connected to a measurement device (7, 8) for determining the voltage difference.

Yet a further feature is that the inputside connection of the measurement resistor (4) is connected to the source of operating voltage ($+U_B$).

Also according to a feature, the inputside connection of the measurement resistor (4) is connected to a source of measurement voltage ($+U_M$).

Another feature is that uncoupling diodes (21, 25) for separation are provided at the output of the operating voltage source ($+U_B$) and of the measurement voltage source ($+U_M$).

Furthermore by the invention, the measurement voltage source ($+U_B$) has a larger voltage difference from a fixed potential than the operating voltage source ($+U_B$) does and the measurement voltage source ($+U_M$) is switched so as to be inactive during the normal operation of the apparatus.

Also a measurement device (47, 48) for measurement of the current is provided.

Still furthermore, the current measurement device has connected in front of it a series connection which consists of two resistors (34, 35) and which is connected to a second operating voltage source (23, 24, 25), the junction point of which is connected by a detachable electric connection (30) to the center tap of the position transmitter (1) and to the measurement device (47, 48), the end of the resistor (35) facing away from the junction lying at a fixed potential, and a measurement voltage source ($+U_M$) is provided the output of which is connected to an external connection of the position transmitter (1).

The invention also provides that the measurement voltage source ($+U_M$) is switched so as to be inactive during the normal operation of the apparatus.

Yet further, the second operating voltage source (23, 24, 25) is switched so as to be inactive during the normal operation of the apparatus.

According to another feature, the detachable electric connection is an opening contact (30) which is controlled by a relay (31).

Still in accordance with a feature, the relay coil (31) is connected by a Z-diode (33) to the measurement voltage source ($+U_M$) and the measurement voltage source has a higher electric potential with respect to a fixed potential than the operating voltage source (20, 21).

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
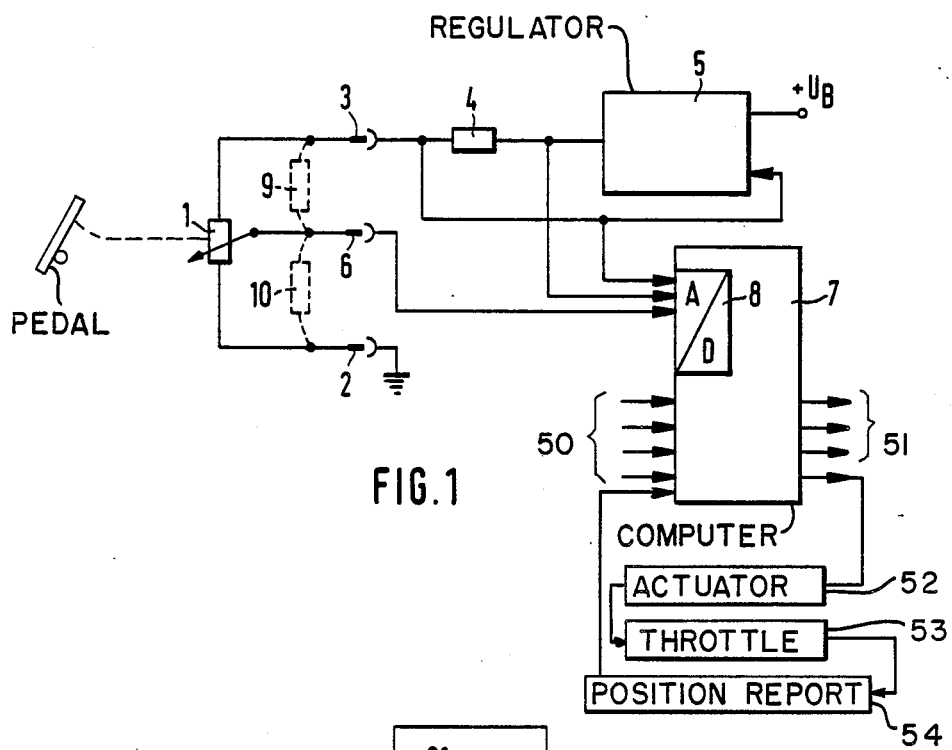
FIG. 1 is a block diagram of a first embodiment of the invention
Figure 4:
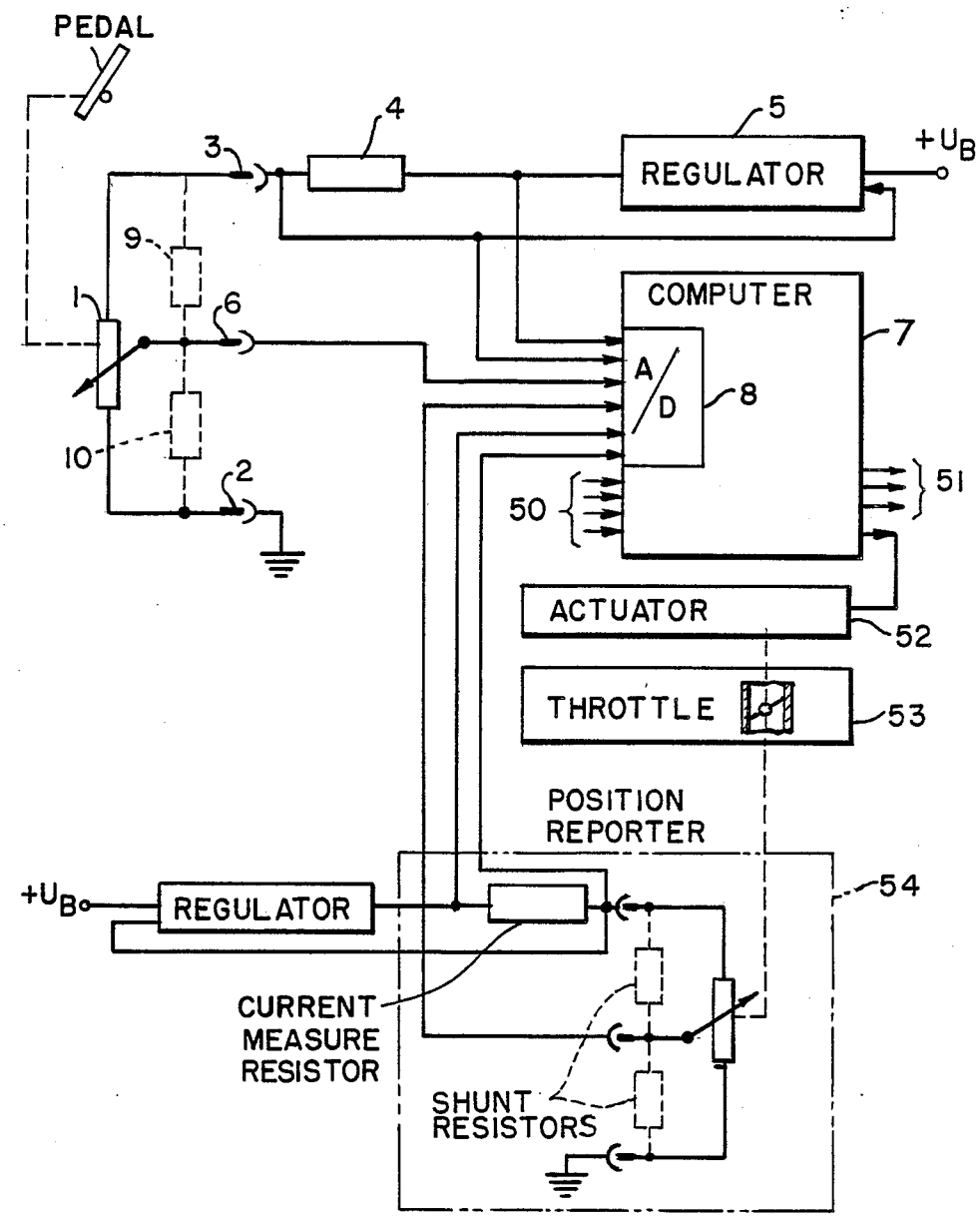
FIG. 4 shows further details in the embodiment of FIG. 1.

In FIGS. 1 and 4 there is shown a variable resistor 1 the position of the wiper of which is in a pre-determined relationship to the position of the accelerator pedal and which is thus used as desired value transmitter. An outer connection of the variable resistor is connected via the connector 2 to a potential which is different from the operating voltage, in this case the vehicle ground. The second connection is connected via another connector 3 and a measurement resistor 4 to the output of a voltage regulator 5. One input of said regulator is fed with the operating voltage $+U_B$. The center tap of the variable resistor 1 is connected via a third connector 6 to an input of an analog-to-digital converter 8 which is arranged in front of a computer 7. The two ends of the measurement resistor 4 are connected to other inputs of the analog-to-digital converter 8. The end of the measurement resistor 4 which is remote from the regulator output is brought back to the control input of the voltage regulator 5. The computer controls the position of the throttle valve in accordance with the intent of the driver, as can be recognized by the position of the accelerator pedal and thus the position of the wiper, and possibly as a function of other parameters, such as length-wise and transverse acceleration of the vehicle or wheel slippage, in the manner that it is in a pre-determined relationship to the position of the accelerator pedal in the steady state. By shunt resistances which can undesireably result for various reasons parallel to the resistance of the potentiometer 1 and which are indicated at 9 and 10, the desired-value of the resistance of the potentiometer can be detrimentally so changed that the speed of the vehicle can no longer be controlled within the pre-determined limits.

By the leak resistances 9, 10, which lie in parallel to the variable resistor 1, the total resistance is reduced with respect to the desired-value. Accordingly, with constant controlled voltage at the output of the voltage regulator 5, an increased current flows through the measurement resistor 4 and the voltage which drops off on said resistor is greater than the pre-determined value. This voltage is passed, by a line from the input and a line from the output of the measurement resistor 4 to the analog-to-digital converter 8 and the computer 7. The latter recognizes the deviation from the normal value. In accordance with one embodiment according to FIG. 1, the computer is ready for instruction upon the opening of the connectors 2, 3, and 6. Upon the reconnecting of the connectors 2, 3, and 6, the deviations are recognized on basis of the leakage resistances.

Figure 2:
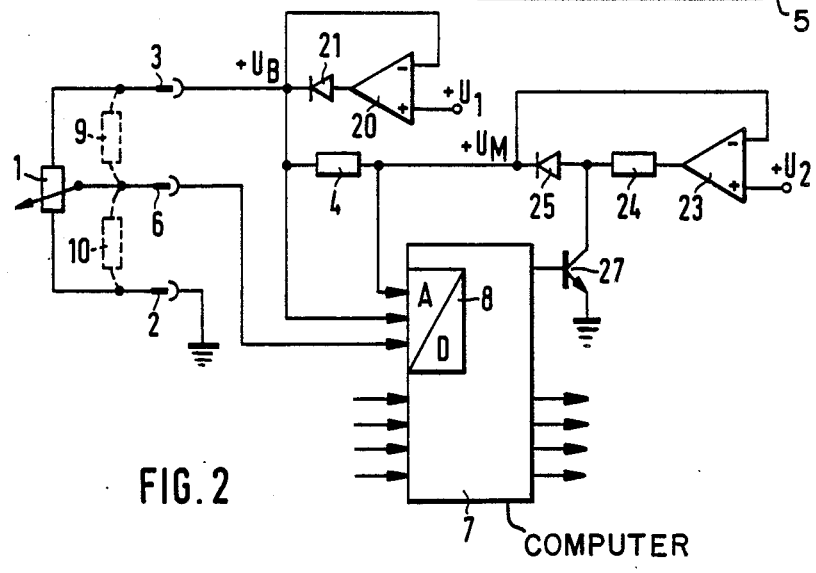
FIG. 2 is a second embodiment, also in the form of a block diagram.

In the embodiment according to FIG. 2, the controlled operating voltage $+U_B$ is present, upon operation, on the variable resistor 1. For this purpose, a first voltage $+U_1$ is fed to a first difference amplifier 20 via the non-inverting input, while the output of the difference amplifier 20 is connected to the anode of a first decoupling diode 21. The cathode of the decoupling diode is connected to the inverting input of the difference amplifier 20 and furthermore, to the cold end of the measurement resistor 4, to an input of the analog-to-digital converter 8 in front of the computer 7 and, via the connector 3, to one outer terminal of the variable resistor 1. The second outer terminal of the variable resistor 1 is connected via a second connector 2 to fixed potential, while the center connection is connected via a third connector 6 to another input of the analog-to-digital converter 8.

To the non-inverting input of a second difference amplifier 23 there is fed a second voltage $+U_2$ which has a greater voltage drop with respect to the fixed potential—in general, ground—than the first voltage $U_1$. The output of the difference amplifier 23 is fed back, via the resistor 24 and the decoupling diode 25, to the inverting input. It is thus adjusted to the measurement voltage $+U_M$. The connection between the resistor 24 and the anode of the decoupling diode 25 is connected to the collector terminal of an NPN-transistor 27. Its emitter is connected to a fixed potential and its base terminal is connected to a control output of the computer 7.

In the operation of the overall device for the controlling of the speed, the control terminal of the computer 7, which is connected to the base terminal of the transistor 27, conducts a positive voltage, which makes the collector-emitter path of the transistor 27 of low ohmic value and pulls the anode terminal of the decoupling diode to a fixed potential. The diode path of the decoupling diode 25 is thus blocked, and the supplying of voltage is effected by the voltage regulator 20.

At cyclic intervals the base of the transistor 27 is placed by computer 7 at a low potential, and the collector-emitter path is thus blocked. Via the decoupling diode the measurement voltage $+U_M$ which is now present is applied to the measurement resistor 4. In a manner similar to that shown in FIG. 1, the voltage drop over the measurement resistor 4 is measured and fed via the analog-to-digital converter to the computer. Leak resistances 9, 10 lead to a stronger voltage drop, which thus represents a measure of the value of the leakage resistances.

Figure 3:
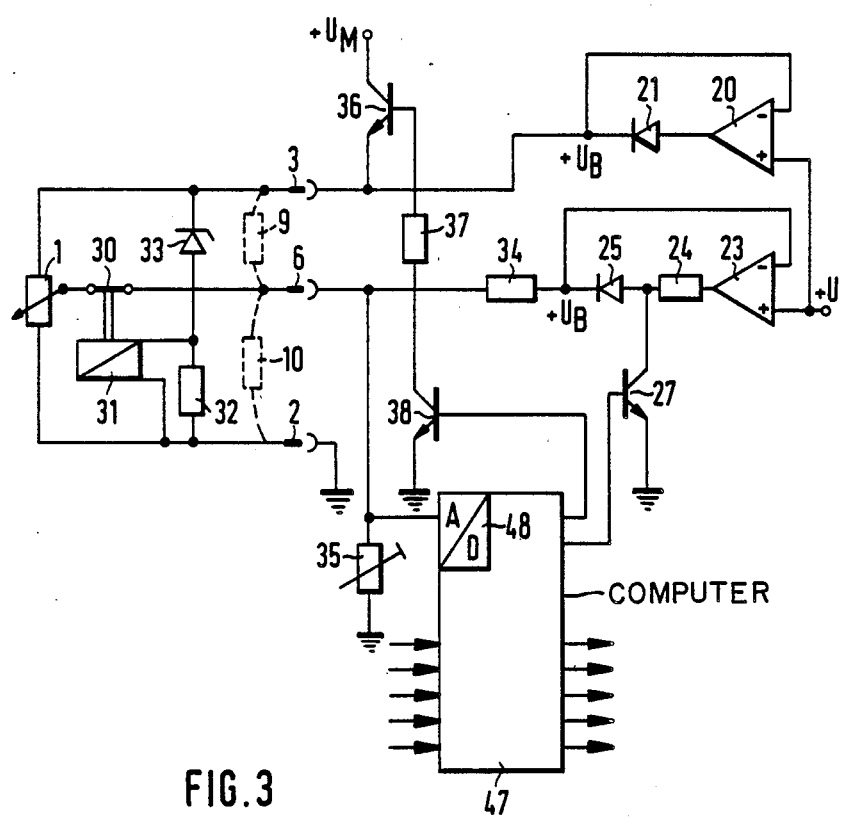
FIG. 3 is a third embodiment, also in the form of a block diagram.

With the embodiment of the invention shown in FIG. 3, the size of the leakage resistances can be determined not only in total value but also individually. Parts in FIG. 3 having the same showing and same function as in FIGS. 1 and 2, are provided with the same reference numbers. In the return-message line the opening contact 30 of a relay 31 is arranged between the center tap of the variable resistor 1 and the connector 6. The relay coil lies in parallel to a resistor 32 between fixed potential and, via the anode connection of Z-diode 33, the outside terminal opposite the fixed potential of the variable resistor 1, and thus at the operating voltage $+U_B$. The operating voltage $+U_B$ is prepared via the uncoupling diode 21 by a difference amplifier 20, which operates as voltage regulator. The non-inverting input of the voltage regulator 20 is connected to the supply voltage $+U$; the output is returned for negative feed-back from the cathode of the uncoupling diode to the inverting input.

A second voltage regulator 23 the non-inverting input of which is also connected to the supply voltage $+U$ and the output of which is fed back from the cathode terminal of the uncoupling diode 25 to the inverting input, supplies the operating voltage $+U_B$ via a first resistor 24, the uncoupling diode 25 and another resistor 34 which is part of a measurement resistance arrangement to the connector 6 and thus, via the closed relay contact, to the center tap of the variable resistor 1. The second resistor of the measurement resistance arrangement is formed by a trim resistor 35, which lies between the connector 6 and fixed potential. The connector 6 is furthermore connected to the input of the analog-to-digital converter 48 in the computer 47.

The collector of a first NPN-transistor 27 is connected to the anode of the decoupling diode 25 and the emitter to fixed potential. The base terminal of the transistor 27 is supplied new to a first control output of the computer with different potentials, and thus the collector-emitter path of the transistor 27 is either blocked or open.

The collector of a second transistor of NPN-type is connected to a measurement voltage $+U_M$ the voltage difference of which from the fixed potential is greater than that of the operating voltage $+U_B$. The emitter of the transistor 36 is connected to the connector 3 and its base terminal via a resistor 37 to the collector of a third transistor 38 of NPN type. The emitter terminal thereof is connected to fixed potential, while its base terminal is connected to a second control output of the computer 47 by which the transistor 38 and thus also the transistor 36 is either blocked or opened.

During normal operation, the transistors 36 and 38 are blocked. The variable resistor 1 is connected via its outside terminals to the connectors 2, 3 and the voltage which is established at the center tap is passed via the closed relay contact 30 and the connector 6 to the input of the analog-to-digital converter 8 in the computer 7. The supplying of the device with operating voltage $+U_B$ takes place by the voltage regulator 20. The transistor 27 is, in this connection, opened by control of the base terminal with higher potential and pulls the output of the voltage regulator 23 to fixed potential via the resistor 24.

For the measurement process, the transistors 38, 36 are opened by applying the base terminal of the transistor 38 to higher potential via the second control output of the computer 47. The higher measurement voltage $+U_M$ connects the Z-diode 33, the relay coil 31 is imparted voltage, and the contact 30 opens. Now an undesired shunt present between the connectors 3 and 6 represents the only galvanic connection between the collector emitter path of the transistor 36 moved over by the measurement voltage and the input of the analog-to-digital converter 48, so that its value can be determined. As additional condition, the value of the trim resistance 35 must be known.

The following determination of the value of the leakage resistance 10 is effected in the manner that the first control output of the computer 47 is placed at low potential and the transistor 27 is thereby blocked. The voltage regulator 23, via the resistor 24 and the uncoupling diode 25, supplies the series resistance arrangement consisting of the resistor 24 and the two parallel resistors 35 and 10, so that the value of the resistor 10 can be determined.

In practical operation the measurement cycles are inserted at periodic intervals into the operating program.

The invention is applicable, independently of the embodiment described, to all variable resistors which, connected as voltage divider, act as position transmitter in automotive vehicles. The variable resistor 1 is configured as a potentiometer.

The set of arrows input to the computers 7, 47, such as the set 50 in FIG. 1 represent input data such as water temperature, air mass flow, vehicular speed and other data used by vehicular computers for engine control. Similarly, the corresponding output sets of arrows, such as the set 51, represent output signals which may be employed in operating a display on a dashboard panel as well as transmission and engine functions. One output signal commands an actuator 52 to position a throttle 53 for metering fuel and air (FIG. 1) or, alternatively, to operate a fuel injector (not shown). A reporter 54 of the throttle position comprises a second resistance voltage divider, not shown but having the same construction as the resistor 1, for reporting the throttle position to the computer 7. The second resistance voltage divider is connected serially with a measurement resistor, such as the resistor 4.

The operation of the circuit of the invention, in each of its embodiments provides for the measurement of current through the potentiometer 1 by the use of the current measurement resistor 4 (FIGS. 1, 2) and 34 (FIG. 3). The voltage drops across the current measurement resistor 4, 34 is proportional to the current, and is applied as a current data input to the computer 7 (FIGS. 1, 2) and 47 (FIG. 3). A shift in current results from the resistors 9 and 10, which shift alters the voltage at the center tap of the potentiometer 1. The computer 7, 47 includes a memory addressed by the current data input to provide a correction signal to the voltage output by the potentiometer 1 at its center tap. An adder within the computer adds the correction value to the potentiometer voltage to correct for the effect of the resistors 9 and 10. In FIG. 3 a further refinement is provided by an alteration of operating voltage, under control of the computer 47, to compensate for the presence of the resistors 9 and 10, the alteration of operating voltage reducing variation in the potentiometer current brought on by the resistors 9 and 10.

I claim:

1. In a circuit device for establishing the operating data of automotive vehicles, the device having at least one resistance voltage divider with variable division ratio as position transmitter, the improvement including
   at least one measurement device for checking operation of the resistance of said at least one resistance voltage divider; and wherein
   said measurement device comprises a current measurement resistor connected serially with at least a portion of said at least one voltage divider for measuring current flow in said at least one voltage divider, said measurement device being responsive to current flow in said at least one voltage divider for monitoring resistance of said at least one voltage divider; and
   said current measurement resistor is arranged in a current feed line to an external connection from the measurement device to the position transmitter.

2. The circuit device according to claim 1, wherein the measurement device is operative with electric transmission of position of an accelerator pedal to a metering element which meters engine input, including at least one of fuel and intake air, to an internal combustion engine in the sense of a follow-up control, in which case said one resistance voltage divider of variable division ratio serves as desired-value transmitter and is mechanically connected to the accelerator pedal.

3. The circuit device according to claim 2, further comprising
   a measuring device for determining voltage difference; and wherein
   the input side connection and the output side connection of the measurement resistor are connected to the measuring device for determining the voltage difference.

4. The circuit device according to claim 1, further comprising
   a measuring device for determining voltage difference; and wherein
   the input side connection and the output side connection of the measurement resistor are connected to the measuring device for determining the voltage difference.

5. The circuit device according to claim 1, wherein an input side connection of said measurement resistor is connected to a source of operating voltage.

6. The circuit device according to claim 1, wherein the input side connection of the measurement resistor is connected to a source of measurement voltage.

7. The circuit device according to claim 6, wherein the output side connection of the measurement resistor is connected to a source of measurement voltage, the circuit device further comprising uncoupling diodes for separation located at an output of the operating voltage source and of the measurement voltage source.

8. The circuit device according to claim 7, wherein the measurement voltage source has a larger voltage difference from a fixed potential than the operating voltage source does and the measurement voltage is switched so as to be inactive during the normal operation of the apparatus.

9. The circuit device according to claim 1, further comprising a source of operating voltage, and measurement means; and wherein
   the resistor of said measurement device is connected via a switchable electric connection to the center tap of said position transmitter, there being a further resistor connected between a fixed potential and a junction between said measurement device and said switchable electric connection to be in series with the resistor of said measurement device, a terminal of said measurement device opposite said junction connecting with the source of operating voltage, said junction connecting with said measuring means; and wherein
   said circuit device further comprises a measurement voltage source with an output connected to an end terminal of the position transmitter.

10. The circuit device according to claim 9, wherein the measurement voltage source is switched by said measurement means so as to be inactive during the normal operation of the apparatus.

11. The circuit device according to claim 9, wherein the operating voltage source is switched by said measurement means so as to be inactive during the normal operation of the apparatus.

12. The circuit device according to claim 9, wherein the switchable electric connection is an opening contact of a relay.

13. The circuit device according to claim 12, wherein the relay comprises,
    a further source of voltage;
    a relay coil connected by a zener diode to the measurement voltage source; and wherein
    the measurement voltage source has a higher electric potential with respect to the fixed potential than the further voltage source.

14. The circuit device according to claim 1, wherein the device is operative with electric transmission of position of a throttle for an internal combustion engine, wherein said at least one resistance voltage divider of variable division ratio serves as actual-value transmitter and is mechanically connected to the throttle.

15. A circuit device for establishing the operating data of automotive vehicles, the device having at least one resistance voltage divider with variable division ratio as position transmitter, the improvement including
    a first measurement device for checking operation of the resistance of a first of said at least one resistance voltage divider; and wherein
    said first measurement device comprises a current measurement resistor connected serially with said first voltage divider, said first measurement device being responsive to current flow in said first voltage divider for monitoring the resistance of said first voltage divider; and wherein
    the first measurement device is operative with electric transmission of position of an accelerator pedal to a metering element, wherein the metering element meters engine input consisting of at least one of the input parameters of air and fuel to an internal combustion engine, and wherein said first voltage divider serves as desired-value transmitter and is mechanically connected to the accelerator pedal, there being a second of said at least one resistance voltage divider mechanically coupled as actual-value transmitter to the metering element, and a second measurement device operatively monitoring the resistance of said second voltage divider; and said current measurement resistor is arranged in a current feed line to an external connection from the measurement device to the desired-value transmitter.

* * * * *